United States Patent
Meiklejohn et al.

(10) Patent No.: US 9,922,108 B1
(45) Date of Patent: Mar. 20, 2018

(54) SYSTEMS AND METHODS FOR FACILITATING DATA TRANSFORMATION

(71) Applicant: Palantir Technologies Inc., Palo Alto, CA (US)

(72) Inventors: David Meiklejohn, Arlington, VA (US); Jeppe Hallgren, Pimlico (GB); Vitaly Pavlenko, Moscow (RU)

(73) Assignee: Palantir Technologies Inc., Palo Alto, CA (US)

( * ) Notice: Subject to any disclaimer, the term of this patent is extended or adjusted under 35 U.S.C. 154(b) by 0 days.

(21) Appl. No.: 15/398,958

(22) Filed: Jan. 5, 2017

(51) Int. Cl.
*G06F 17/30* (2006.01)

(52) U.S. Cl.
CPC .. *G06F 17/30569* (2013.01); *G06F 17/30294* (2013.01); *G06F 17/30607* (2013.01)

(58) Field of Classification Search
None
See application file for complete search history.

(56) References Cited

U.S. PATENT DOCUMENTS

| | | | |
|---|---|---|---|
| 6,289,338 B1 | 9/2001 | Stoffel et al. | |
| 6,463,404 B1 | 10/2002 | Appleby | |
| 6,523,172 B1 | 2/2003 | Martinez-Guerra et al. | |
| 6,539,538 B1 | 3/2003 | Brewster et al. | |
| 6,640,231 B1 | 10/2003 | Andersen et al. | |
| 6,748,481 B1 | 6/2004 | Parry et al. | |
| 6,877,137 B1 | 4/2005 | Rivette et al. | |
| 7,027,974 B1 | 4/2006 | Busch et al. | |
| 7,089,541 B2 | 8/2006 | Ungar | |
| 7,237,192 B1 | 6/2007 | Stephenson et al. | |
| 7,240,330 B2 | 7/2007 | Fairweather | |
| 7,533,069 B2 | 5/2009 | Fairweather | |
| 7,685,083 B2 | 3/2010 | Fairweather | |
| 7,877,421 B2 | 1/2011 | Berger et al. | |
| 7,962,495 B2 | 6/2011 | Jain et al. | |
| 8,117,022 B2 | 2/2012 | Linker | |
| 8,132,149 B2 | 3/2012 | Shenfield et al. | |
| 8,271,948 B2 | 9/2012 | Talozi et al. | |
| 8,332,354 B1 | 12/2012 | Chatterjee et al. | |
| 8,418,085 B2 | 4/2013 | Snook et al. | |

(Continued)

FOREIGN PATENT DOCUMENTS

| | | |
|---|---|---|
| CA | 2666364 | 1/2015 |
| DE | 102014204840 | 9/2014 |

(Continued)

OTHER PUBLICATIONS

"A Tour of Pinboard," <http://pinboard.in/tour> as printed May 15, 2014 in 6 pages.

(Continued)

*Primary Examiner* — Hosain Alam
*Assistant Examiner* — Tuan-Khanh Phan
(74) *Attorney, Agent, or Firm* — Sheppard Mullin Richter & Hampton LLP

(57) ABSTRACT

Systems and methods are provided for facilitating the transformation of data from a tabular data set organized according to a data schema to an object based data set organized according to a data ontology. The provided systems and methods offer a graphical user interface for mapping the tabular based data to the object based data set according to the data ontology. The tabular based data may be transformed according to the mapping.

19 Claims, 5 Drawing Sheets

(56) References Cited

U.S. PATENT DOCUMENTS

| | | | |
|---|---|---|---|
| 8,489,623 | B2 | 7/2013 | Jain et al. |
| 8,560,494 | B1 | 10/2013 | Downing |
| 8,689,182 | B2 | 4/2014 | Leithead et al. |
| 8,855,999 | B1 | 10/2014 | Elliot |
| 8,903,717 | B2 | 12/2014 | Elliot |
| 8,930,897 | B2 | 1/2015 | Nassar |
| 9,009,827 | B1 | 4/2015 | Albertson et al. |
| 9,201,920 | B2 | 12/2015 | Jain et al. |
| 9,223,773 | B2 | 12/2015 | Isaacson |
| 9,229,952 | B1 | 1/2016 | Meacham et al. |
| 2003/0074187 | A1 | 4/2003 | Ait-Mokhtar et al. |
| 2003/0172053 | A1 | 9/2003 | Fairweather |
| 2003/0177112 | A1 | 9/2003 | Gardner |
| 2004/0044992 | A1 | 3/2004 | Muller et al. |
| 2004/0083466 | A1 | 4/2004 | Dapp et al. |
| 2004/0093344 | A1* | 5/2004 | Berger ............ G06F 17/30604 |
| 2004/0221223 | A1 | 11/2004 | Yu et al. |
| 2004/0260702 | A1 | 12/2004 | Cragun et al. |
| 2005/0039119 | A1 | 2/2005 | Parks et al. |
| 2005/0091420 | A1 | 4/2005 | Snover et al. |
| 2005/0183005 | A1 | 8/2005 | Denoue et al. |
| 2006/0271838 | A1 | 11/2006 | Carro |
| 2007/0074169 | A1 | 3/2007 | Chess et al. |
| 2007/0078872 | A1 | 4/2007 | Cohen |
| 2007/0112714 | A1 | 5/2007 | Fairweather |
| 2007/0233709 | A1 | 10/2007 | Abnous |
| 2008/0034327 | A1 | 2/2008 | Cisler et al. |
| 2008/0140387 | A1 | 6/2008 | Linker |
| 2008/0148398 | A1 | 6/2008 | Mezack et al. |
| 2008/0228467 | A1 | 9/2008 | Womack et al. |
| 2008/0281580 | A1 | 11/2008 | Zabokritski |
| 2009/0172821 | A1 | 7/2009 | Daira et al. |
| 2009/0177962 | A1 | 7/2009 | Gusmorino et al. |
| 2009/0228507 | A1 | 9/2009 | Jain et al. |
| 2009/0254970 | A1 | 10/2009 | Agarwal et al. |
| 2010/0011282 | A1 | 1/2010 | Dollard et al. |
| 2010/0204983 | A1 | 8/2010 | Chung et al. |
| 2010/0257015 | A1 | 10/2010 | Molander |
| 2010/0257515 | A1 | 10/2010 | Bates et al. |
| 2010/0306285 | A1 | 12/2010 | Shah et al. |
| 2010/0313119 | A1 | 12/2010 | Baldwin et al. |
| 2011/0213791 | A1 | 9/2011 | Jain et al. |
| 2011/0258216 | A1 | 10/2011 | Supakkul et al. |
| 2012/0137235 | A1 | 5/2012 | TS et al. |
| 2012/0191446 | A1 | 7/2012 | Binsztok et al. |
| 2012/0221553 | A1 | 8/2012 | Wittmer et al. |
| 2012/0304150 | A1 | 11/2012 | Leithead et al. |
| 2013/0024268 | A1 | 1/2013 | Manickavelu |
| 2013/0086482 | A1 | 4/2013 | Parsons |
| 2013/0091084 | A1 | 4/2013 | Lee |
| 2013/0124193 | A1 | 5/2013 | Holmberg |
| 2013/0225212 | A1 | 8/2013 | Khan |
| 2013/0246560 | A1 | 9/2013 | Feng et al. |
| 2013/0251233 | A1 | 9/2013 | Yang et al. |
| 2013/0275446 | A1 | 10/2013 | Jain et al. |
| 2014/0019423 | A1 | 1/2014 | Leinsberger et al. |
| 2014/0047319 | A1 | 2/2014 | Eberlein |
| 2014/0244388 | A1 | 8/2014 | Manouchehri et al. |
| 2015/0046481 | A1 | 2/2015 | Elliot |
| 2015/0100559 | A1 | 4/2015 | Nassar |
| 2015/0142766 | A1 | 5/2015 | Jain et al. |
| 2015/0261847 | A1 | 9/2015 | Ducott et al. |

FOREIGN PATENT DOCUMENTS

| | | | |
|---|---|---|---|
| DE | 102014215621 | | 2/2015 |
| EP | 2221725 | | 8/2010 |
| EP | 2778913 | | 9/2014 |
| EP | 2778914 | | 9/2014 |
| EP | 2778986 | | 9/2014 |
| EP | 2911078 | | 8/2015 |
| EP | 3018553 | | 5/2016 |
| GB | 2366498 | | 3/2002 |
| GB | 2513007 | | 10/2014 |
| GB | 2518745 | | 4/2015 |
| NL | 2013306 | | 2/2015 |
| NL | 2011642 | | 8/2015 |
| WO | WO 2002/035376 | | 5/2002 |
| WO | WO 2003/060751 | | 7/2003 |
| WO | WO 2008/064207 | | 5/2008 |
| WO | WO 2011/071833 | | 6/2011 |

OTHER PUBLICATIONS

Kahan et al., "Annotea: an Open RDF Infrastructure for Shared Web Annotations", Computer Networks, Elsevier Science Publishers B.V., vol. 39, No. 5, dated Aug. 5, 2002, pp. 589-608.
Official Communication for U.S. Appl. No. 14/025,653 dated Oct. 6, 2015.
Official Communication for U.S. Appl. No. 14/134,558 dated Oct. 7, 2015.
Official Communication for U.S. Appl. No. 14/025,653 dated Mar. 3, 2016.
Official Communication for European Patent Application No. 14159629.6 dated Jul. 31, 2014.
Official Communication for New Zealand Patent Application No. 622414 dated Mar. 24, 2014.
Official Communication for New Zealand Patent Application No. 622484 dated Apr. 2, 2014.
Delicious, <http://delicious.com/> as printed May 15, 2014 in 1 page.
Johnson, Maggie, "Introduction to YACC and Bison".
Official Communication for New Zealand Patent Application No. 622404 dated Mar. 20, 2014.
Official Communication for Australian Patent Application No. 2014201507 dated Feb. 27, 2015.
Official Communication for European Patent Application No. 14158977.0 dated Apr. 16, 2015.
Official Communication for European Patent Application No. 14158958.0 dated Apr. 16, 2015.
Official Communication for U.S. Appl. No. 14/526,066 dated Jan. 21, 2016.
Symantec Corporation, "E-Security Begins with Sound Security Policies," Announcement Symantec, Jun. 14, 2001.
Official Communication for European Patent Application No. 15155845.9 dated Oct. 6, 2015.
Geiger, Jonathan G., "Data Quality Management, The Most Critical Initiative You Can Implement", Data Warehousing, Management and Quality, Paper 098-29, SUGI 29, Intelligent Solutions, Inc., Bounder, CO, pp. 14, accessed Oct. 3, 2013.
Klemmer et al., "Where Do Web Sites Come From? Capturing and Interacting with Design History," Association for Computing Machinery, CHI 2002, Apr. 20-25, 2002, Minneapolis, MN, pp. 8.
Kokossi et al., "D7-Dynamic Ontoloty Management System (Design)," Information Societies Technology Programme, Jan. 10, 2002, pp. 1-27.
Miklau et al., "Securing History: Privacy and Accountability in Database Systems," 3rd Biennial Conference on Innovative Data Systems Research (CIDR), Jan. 7-10, 2007, Asilomar, California, pp. 387-396.
Morrison et al., "Converting Users to Testers: An Alternative Approach to Load Test Script Creation, Parameterization and Data Corellation," CCSC: Southeastern Conference, JCSC 28, Dec. 2, 2012, pp. 188-196.
Niepert et al., "A Dynamic Ontology for a Dynamic Reference Work", Joint Conference on Digital Libraries, Jun. 17-22, 2007, Vancouver, British Columbia, Canada, pp. 1-10.
Nivas, Tuli, "Test Harness and Script Design Principles for Automated Testing of non-GUI or Web Based Applications," Performance Lab, Jun. 2011, pp. 30-37.
Palantir, "Extracting and Transforming Data with Kite," Palantir Technologies, Inc., Copyright 2010, pp. 38.
Palantir, "Kite," https://docs.palantir.com/gotham/3.11.1.0/adminreference/datasources.11 printed Aug. 30, 2013 in 2 pages.
Palantir, "Kite Data-Integration Process Overview," Palantir Technologies, Inc., Copyright 2010, pp. 48.

(56) References Cited

OTHER PUBLICATIONS

Palantir, "Kite Operations," Palantir Technologies, Inc., Copyright 2010, p. 1.
Palantir, "The Repository Element," https://docs.palantir.com/gotham/3.11.1.0/dataguide/kite_config_file.04 printed Aug. 30, 2013 in 2 pages.
Palantir, "Write a Kite Configuration File in Eclipse," Palantir Technologies, Inc., Copyright 2010, pp. 2.
Palantir, https://docs.palantir.com/gotham/3.11.1.0/dataguide/baggage/KiteSchema printed Aug. 30, 2013 in 1 page.
Palantir, https://docs.palantir.com/gotham/3.11.1.0/dataguide/baggage/KiteSchema.xsd printed Apr. 4, 2014 in 4 pages.
Palermo, Christopher J., "Memorandum," [Disclosure relating to U.S. Appl. No. 13/916,447, filed Jun. 12, 2013, and related applications], Jan. 31, 2014 in 3 pages.
Wollrath et al., "A Distributed Object Model for the Java System," Conference on Object-Oriented Technologies and Systems, Jun. 17-21, 1996, pp. 219-231.
Notice of Allowance for U.S. Appl. No. 14/044,800 dated Sep. 2, 2014.
Notice of Allowance for U.S. Appl. No. 14/508,696 dated Jul. 27, 2015.
Notice of Allowance for U.S. Appl. No. 14/533,433 dated Sep. 1, 2015.
Notice of Allowance for U.S. Appl. No. 14/148,568 dated Aug. 26, 2015.
Official Communication for Great Britain Patent Application No. 1404479.6 dated Aug. 12, 2014.
Official Communication for New Zealand Patent Application No. 622497 dated Mar. 26, 2014.
Official Communication for New Zealand Patent Application No. 622497 dated Jun. 19, 2014.
Official Communication for New Zealand Patent Application No. 622389 dated Mar. 20, 2014.
Official Communication for European Patent Application No. 14158958.0 dated Jun. 3, 2014.
Official Communication for European Patent Application No. 14158977.0 dated Jun. 10, 2014.
Official Communication for Canadian Patent Application No. 2666364 dated Jun. 4, 2012.
Official Communication for Israel Patent Application No. 198253 dated Nov. 24, 2014.
Official Communication for Great Britain Patent Application No. 1413935.6 dated Jan. 27, 2015.
Official Communication for Australian Patent Application No. 2014201506 dated Feb. 27, 2015.
Official Communication for Australian Patent Application No. 2014201511 dated Feb. 27, 2015.
Official Communication for Netherlands Patent Application No. 2013306 dated Apr. 24, 2015.
Official Communication for Great Britain Patent Application No. 1404479.6 dated Jul. 9, 2015.
Official Communication for U.S. Appl. No. 14/148,568 dated Oct. 22, 2014.
Official Communication for U.S. Appl. No. 14/508,696 dated Mar. 2, 2015.
Official Communiation for U.S. Appl. No. 14/148,568 dated Mar. 26, 2015.
Official Communication for Israel Patent Application No. 198253 dated Jan. 12, 2016.
Official Communication for U.S. Appl. No. 14/631,633 dated Feb. 3, 2016.
Official Communication for Netherlands Patent Application No. 2012434 dated Jan. 8, 2016.
Official Communication for European Patent Application No. 14158977.0 dated Mar. 11, 2016.
Official Communication for European Patent Application No. 14158958.0 dated Mar. 11, 2016.
Official Communication for New Zealand Patent Application No. 622513 dated Apr. 3, 2014.
Official Communication for U.S. Appl. No. 14/879,916 dated Apr. 15, 2016.
Official Communication for U.S. Appl. No. 13/557,100 dated Apr. 7, 2016.
Official Communication for European Patent Application No. 15192965.0 dated Mar. 17, 2016.
Official Communication for U.S. Appl. No. 14/526,066 dated May 6, 2016.
Official Communication for European Patent Application No. 14159464.8 dated Feb. 18, 2016.
Official Communication for U.S. Appl. No. 14/954,680 dated May 12, 2016.
Official Communication for U.S. Appl. No. 14/134,558 dated May 16, 2016.
Notice of Allowance for U.S. Appl. No. 14/879,916 dated Jun. 22, 2016.
Official Communication for U.S. Appl. No. 14/134,558 dated Aug. 26, 2016.
Anonymous, "BackTult—JD Edwards One World Version Control System," printed Jul. 23, 2007 in 1 page.
Official Communication for Great Britain Patent Application No. 1413935.6 dated Dec. 21, 2015.

\* cited by examiner

SYSTEMS AND METHODS FOR FACILITATING DATA TRANSFORMATION

FIELD OF THE INVENTION

This disclosure relates to approaches for facilitating data transformation.

BACKGROUND

Under some approaches, a platform for analyzing various data may be deployed. The data-analysis platform may support an object-based data modeling framework. Frequently, data may be collected in a tabular format. Importing tabular formatted data into an object-based data modeling platform may require applying the ontology of the object-based data platform to a tabular data set to transform the tabular data set into data that conforms as required for the object-based data modeling platform. Object-based data modeling frameworks may provide users and analysts with tools for gaining insights into data sets that may not be readily apparent in other frameworks. There may be advantages to transforming data to an object based framework for analysis. Performing such a transform, however, may require a user familiar with computer coding, the tabular data framework, and the object-based data framework. Data analysts with weaker familiarity and comfort with computer coding and/or data manipulation in the tabular data framework may have difficulty viewing and working with such data. Even for users comfortable with these techniques, writing transforms and developing methods of viewing data within an object based framework may be repetitive and/or time consuming.

These and other drawbacks exist with some data management systems.

SUMMARY

A claimed solution rooted in computer technology overcomes these problems specifically arising in the realm of computer technology. In various implementations, a computing system is configured to provide tools that facilitate the manipulation and transformation of tabular based data into an object-based data modeling framework without the need to write software code. The computing system may provide a data modelling service, which may permit a user to translate data from a tabular format to an object-property format via a point and click interface. The computer system may receive the user's point/click input and generate the required software code to instantiate the user's inputs. In an additional implementation, the computer system may facilitate the importation of data from other tabular data sources. In yet another implementation, the computer system may assist in providing a data visualization to the user, by comparing the user's data set to a repository of data sets already associated with an object-property format and/or data visualizations. Based on the comparison, the computer system may provide a data visualization template for the user. The collection of tools provided may permit a user that is not well versed in software and tabular data manipulation to work with large tabular data sets.

Transformation of tabular data so that it may be stored according to an object based ontology is a problem that arises specifically in the realm of computer based data analysis. A tabular based data system may store data in tables of rows and columns. An object based data system may include an ontology that provides definitions of data objects and potential links between the data objects. Translation between the two requires transforming the tabular based data into an object based format, creating objects from the tabled data and generating appropriate links between the tabled data. Implementations of the technology described herein may provide a data modeling service that permits a user to map tabular data into an object based format according to a provided ontology through a visual user interface. As the user selects tabular data for mapping to the ontology via a point and click interface, the system may generate the software code required to perform a transform of the tabular data into the object based data. The system may provide additional data analysis tools that facilitate the importation of external data. The user may access a library or marketplace of available data sets and select one to import. The system may automate a comparison between the user's data and the external data according to the ontology of the two data sets, the data stored in the data sets, and other factors. In addition, the system may provide tools for generating data visualizations. Constructing a custom data visualization from scratch may be time consuming. When a user wishes to develop a data visualization, they may access a library of previous user-built data visualizations. The previous data visualizations may be scored according to similarities between the user's data and the data underlying the previous visualization. Thus, a user may select a previously built data visualization as a starting point for their own analysis, where the previously built data visualization was built to visualize and present data similar to the user's own.

In an implementation, a system for assisting a user in performing transform of an origin data set into a target data set is provided. The system may include one or more processors and a memory storing instructions. When executed by the one or more processors, the instructions may cause the system to obtain the origin data set, the origin data set being organized in a tabular framework defined by an origin data schema, provide, to a user, a graphical user interface displaying the origin data set, receive, from a user, at least one designation of a data object within the origin data set, generate a data transform according to the at least one designated data object, and transform the origin data set into the target data set, the target data set having an object based framework.

In another implementation, a computer implemented method of assisting a user in the transform of an origin data set into a target data set, the method being performed on a computer system having one or more physical processors programmed with computer program instructions may be provided. The method may include obtaining, by the computer system, the origin data set, the origin data set being organized in a tabular framework defined by an origin data schema, providing, by the computer system, to a user, a graphical user interface displaying the origin data set, receiving, by the computer system, from a user, at least one designation of a data object within the origin data set, generating, by the computer system, a data transform according to the at least one designated data object, and transforming, by the computer system, the origin data set into the target data set, the target data set having an object based framework.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the technology are utilized, and the accompanying drawings of which

DETAILED DESCRIPTION

The technology described herein relates to systems and methods for assisting a user in performing data analysis. In some implementations, the technology may facilitate a data transformation between a tabular data structure and an object based data structure. Object based data structures may provide powerful tools for generating insights about data and links between data. Many systems may collect data in a tabular format, including rows and columns. Transforming tabular data into object based data may be necessary to access the insights available through an object based data representation. The technology described herein provides systems and methods for facilitating the transformation of data stored in a tabular form to an object based structure. The technology described herein further provides systems and methods for facilitating the integration and comparison of two tabular data sets. The technology described herein further provides systems and methods for facilitating the visualization of object based data structures.

Implementations of the invention may involve the transformation of data from a tabular based data structure to an object based data structure. A tabular based data structure may include data stored in a multitude of tables, each table having a plurality of rows and columns. Data in a tabular structure may be linked across tables.

Figure 1:
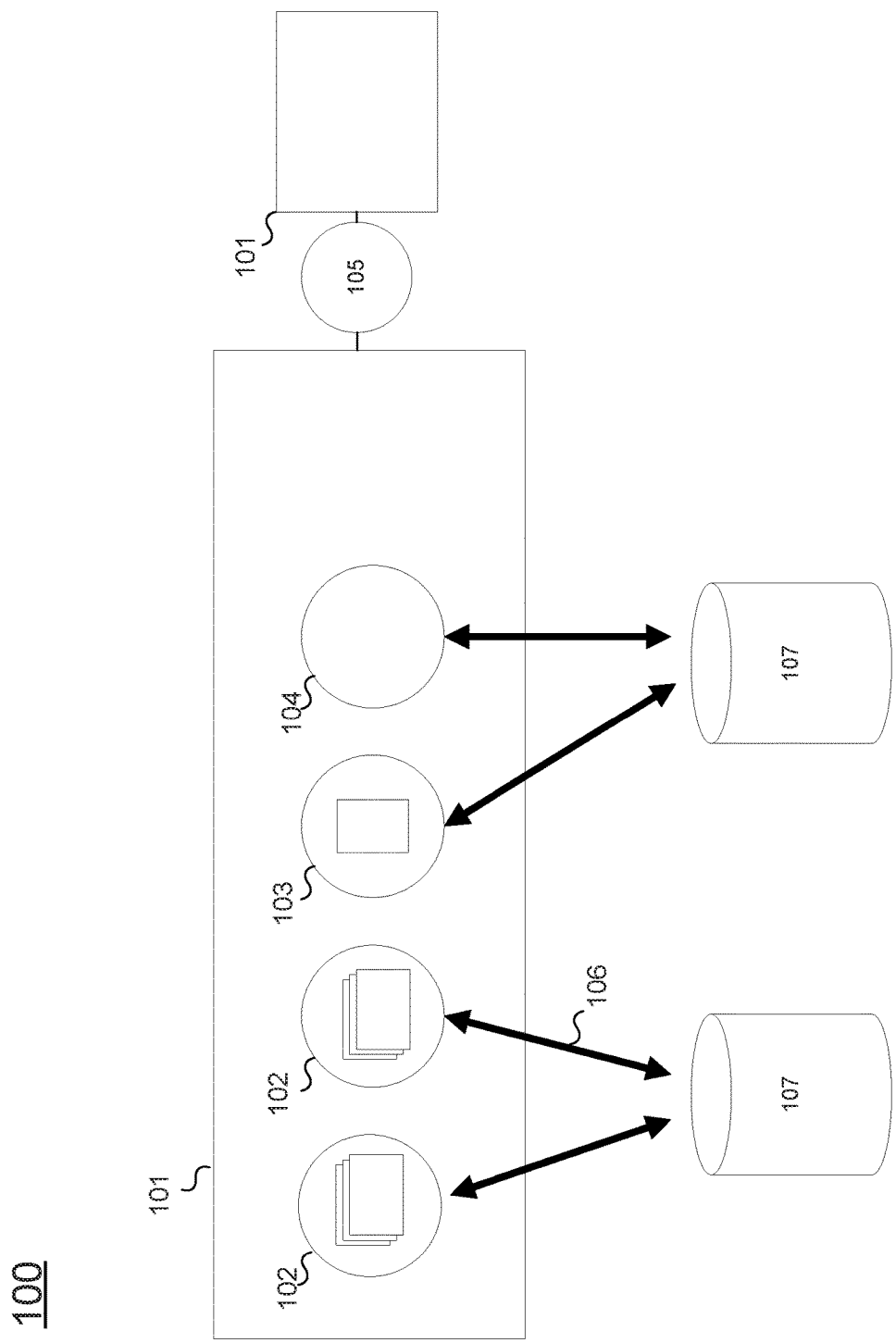
FIG. 1 depicts an object based data structure.

FIG. 1 depicts an object based data structure 100. Object based data structure 100 is centered around data objects 101. Each data object 101 may include several components, including one or more object properties 102, one or more data notes 103, one or more media components 104, and one or more data links 105. The origin of data stored in data object 101 may be stored in a data source record 106 that indicates a data source 107 of the stored data.

The object model is the framework for how data is stored. The object model is further defined by an ontology, defining the types of data and how they are stored in a given system. The ontology may be dynamic, updated to match evolving needs of the system and analysts. The ontology may define types of data objects 101, object properties 102, and data links 105. The ontology may further define which data types may be associated with each other. Each data types may have a URI (uniform resource identifier) that identifies it.

Object types define the kinds of things that may be represented in the system, and provide structure for data objects 101. Object types may be derived from, for example, entity types, event types, document types, and multimedia types. Event and document types may have temporal and geospatial data directly included within the data object 101 itself. An object type may define the number and composition of properties 102, notes 103, and media components 104 of a data object 101. The object type may further define what other types of objects that data links 105 may permit association with. For example, an entity object type may define a data object 101 used to store data about a person, and may include data properties 102 for storing name, address, occupation, e-mail address, phone number, etc. Data links 105 of an entity object 101 may permit the entity object 101 to be linked to other entity objects (e.g., friends or business associates), linked to event objects (e.g., events attended or invited to), linked to document objects (e.g., authored), etc.

Property types may define the type and behavior of input data. Property types may define the structure of the data stored in an object property 102. The property type may define one or more data fields, the type of data associated with the field, as well as tools that may operate on the data fields. Property types may be simple, including a single data field, and/or may be composite, including multiple data fields. For example, an e-mail property type may define an e-mail object property. For example, the e-mail address john@acmeinc.com may be stored in an e-mail object property as follows: URI: com.property.Email, Base Type: Composite, with these components: EMAIL_USERNAME with the value "john," EMAIL_DOMAIN with the value "acmeinc.com." Further, the e-mail property type may define tools for parsing and concatenating the username and the domain, depending on what is required.

Link types may define the types of data links 105 that can exist between two objects 101.

Links may be symmetric or asymmetric. All links may have one object that is considered the "parent" object, and the other that is the "child." In the case of symmetric links, e.g., "Spouse Of," which the parent and child objects are not contextually important. In the case of asymmetric links, like "Manager Of/Managed By," the parent and child may reflects the direction of the link.

Thus, the ontology of the object based data system may define the way in which data is organized in the object based data system. The ontology defines the types of objects that may be stored and the components of the defined data objects 101 as well as the manner in which the defined data objects may link to one another via data links 105.

Figure 2:
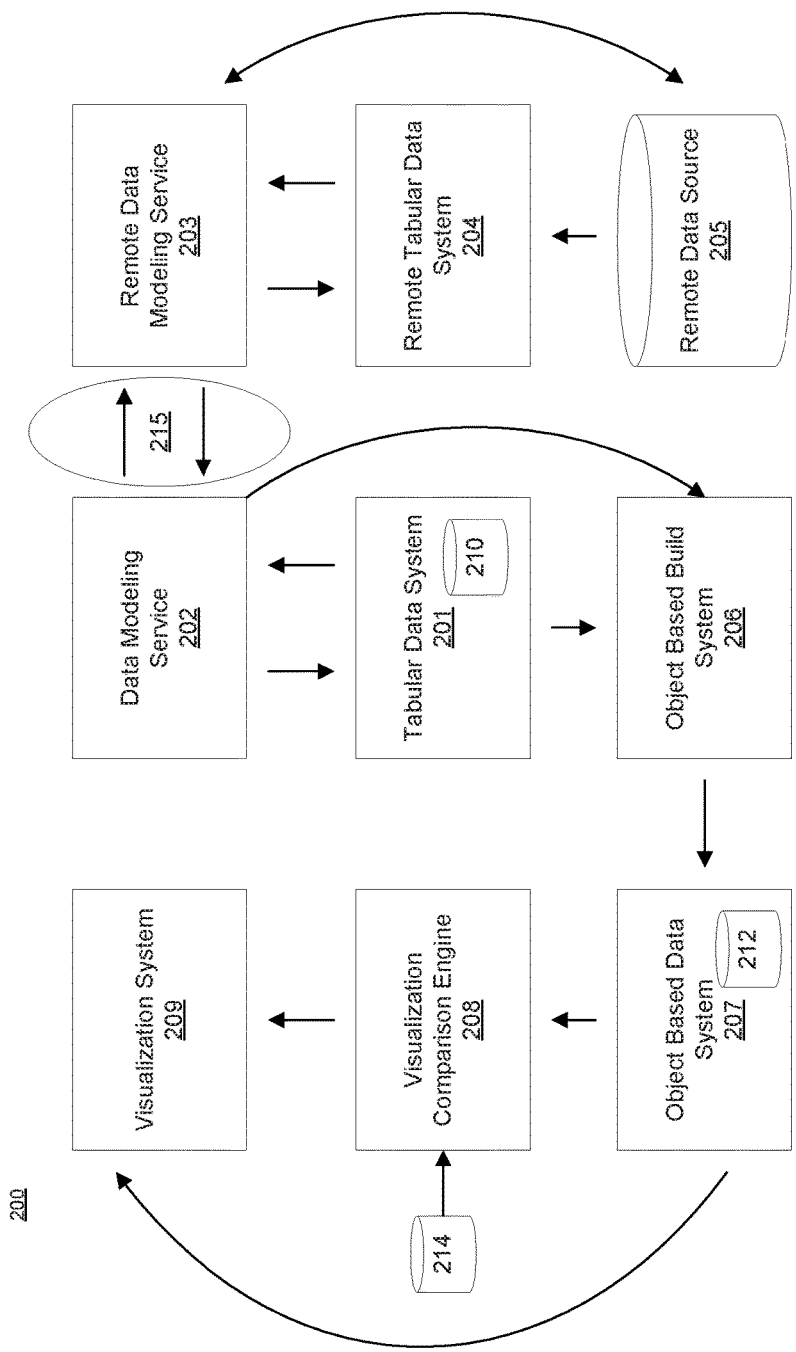
FIG. 2 depicts a process schematic of data analysis assistance tools, according to some implementations.

FIG. 2 depicts a schematic 200 of the operation of various aspects of the present technology. Schematic 200 depicts the interaction between various data analysis assistance tools associated with the technology, according to some implementations. In some implementations, a tabular data system 201, data modeling service 202, object based build system 206, object based data system 207, visualization comparison engine 208, and visualization system 209 may be provided. Data modeling service 202 may interact with a remote data modeling service 203, which may access a remote tabular data system 204 and a remote data source 205. Tabular data system 201 may access an origin data set 210 while object based data system 207 and visualization system 209 may access and manipulate a target data set 212.

Tabular data system 201 may include a system configured to provide tools and functions for handling an origin data set 210, including the entry, manipulation, modification, visualization, access, storage, deletion, and other functions with respect to the tabular based data contained therein. Tabular data system 201 may be configured to access or otherwise obtain tabular data set 210. Origin data set 210 may be organized via a tabular framework defined by a origin data set schema. The schema may define the tables, columns, and rows that constitute the tabular framework, as well as their relationships with each other.

Data modeling service 202 may be configured to interact with the tabular data system 201 and to provide a user with a visual or graphical interface for interacting with the tabular data system 201. Data modeling service 202 may also be configured to access a target data set ontology. As described above with respect to FIG. 1, a data set ontology may define the organizational structure and hierarchy of an object based data set, and may include information about objects, their associated properties and data, and the way in which they may interact with one another.

Data modeling service 202 may use the target data set ontology to provide the user with options for mapping the origin data set to a target data set according to the ontology. A user may view all or a portion of a tabular data set and designate, through a graphical user interface, how the data of the origin data set should be mapped to the target data set according to the target data set ontology. A graphical user interface includes a computer interface that presents graphical, visual, and/or iconic representations and notations in addition to text elements to aid in user comprehension. A graphical user interface may be distinguished from an all text interface, such as a command line interface. Graphical user interfaces as used herein may include point and click interfaces, and other styles of user interface that permit a user to accomplish many tasks via the use of a computer mouse or other pointing device. In some implementations, a user may designate a table of the origin data set as corresponding to an object 101 according to the target data set ontology. After making such a designation, the user may be provided the option of designating the columns of the data set as corresponding to properties 102 that are available based on the object type selected for the table. The user may further determine to link entries within the table to other entries in the table or to entries of different tables to create object links 205. As the user provides the designations via the point and click interface, data modeling service 202 may send the selected mappings to the object based build system 206, which may generate a transform script according to the user's selected mappings.

For example, a user may view a table of employees. The table may include several rows, one for each employee, and a series of columns including information about the employee, e.g., employee ID, salary, e-mail address, home address, years employed, and any other relevant employment data. A user may select the table and designate the entire table as corresponding to an object type of "person" according to the target data set ontology. Next, the user may select each column of the table in turn. When a column is selected, a drop down list of property types that are available for the object type "person" may be displayed. The user may select the appropriate property type for one or more columns in the table. The user may determine not to select any property types for some columns in the table, and thus exclude that data from the transform. The user may also specify object links 105 between object-entries in the table and/or between an object-entry in the table and another object-entry in another table that has already been designated as an object. When the user has finished working with one table, they may move to another table within the origin data set 210 and/or indicate that they are finished working with the origin data set 210 via the user interface.

Accordingly, a user may, via the data modeling service 202, designate or map some or all data of the origin data set 210 for transform to a target data set 212 according to a target data set ontology. During the mapping process, data modeling service 202 may send the details of the mapping to object based build system 206, which may generate the code of a transform script for carrying out the user's mapping. In some implementations, data modelling service 202 may wait to send the details of the mapping until the user makes a request to do so. Object based build system 206 may, at the user's request, at any time during user's interaction with the origin data set 210, and/or at the completion of the mapping process, deploy the generated transform script across all or a portion of the origin data set 210 to generate the target data set 212, which may then be stored in a memory module for access by object based data system 207.

In some implementations, a user may access additional data sets, e.g., remote data source 205, via a remote data modeling service 203. In some implementations, connection to remote data modeling service 203 may be facilitated by a data exchange 215. Data exchange 215 may provide a venue providing access to one or more external data sets. The provided external data sets may be publically available data, for example, weather data sets or other non-proprietary data. A user may access a data exchange 215 and view a list of available data sets. In some implementations, a data exchange 215 may be provided to the general public. In some implementations, a data exchange 215 may be provided to specific users, for example, to users within a specific organization, institution, or corporation, to users participating in a cooperative data exchange, to user paying for a data service, and/or to other selective groups of users. A user may select a specific remote data source 205 from options listed on the data exchange 215.

In some implementations, remote data source 205 may be accessible via an associated remote data modeling service 203. Remote data modeling service 203 may access remote data source 205 directly, and/or via a remote tabular data system 204. Remote data modeling service 203 may impose a remote data source ontology on the data of remote data source 205.

A user may wish to combine the origin data set 210 with all or a portion of remote data source 205 when creating target data set 212. In some implementations, data modeling service 202 may facilitate the integration of remote data source 205 and origin data set 210 via a comparison between the target data set ontology and the remote data source ontology.

In some implementations, data modeling service 202 may access the remote data source ontology and suggest portions of the remote data source 205 suitable for integration based on similarities between the data sets as indicated by a comparison between the two ontologies. In some implementations, data modeling service 202 may identify objects of the remote data source 205 having a same type as objects of the target data set ontology as data to be imported. For example, an origin data set 210 may include data about energy usage. The target data set ontology may include "day" objects storing data about energy usage and other information for specific days. A remote data source 205 containing information about weather may also include "day" objects including information about weather on specific days. The system may determine that both of the "day" objects are ontologically similar, and may suggest the importation of the weather set "day" objects during data transformation. This may provide the user with the ability to examine energy usage according to the weather on specific days.

In some implementations, data modeling service 202 may suggest data of remote data source 205 for import based on similarities between object types that are not exact matches. in some implementations, a user may provide instructions to data modeling service 202 to select specific object types of remote data source 205 for importation. A person of skill in the art may recognize additional methods of selecting data of remote data source 205 based on the target and origin data set ontologies without departing from the scope of the invention.

As discussed above, object based build system 206 may deploy the generated transform script across the origin data set 210 to generate the target data set 212. If a user has selected data from a remote data source 205, that too may be transformed by the object based build system according to the remote data source ontology.

Object based data system 207 may provide a user with the ability to access and manipulate target data set 212 in an object based framework. A user may wish to generate visualizations of the target data set 212 for analysis. Visualizations may use the target set 212 to provide graphs, charts, timelines, and other visual representations of data stored in target data set 212.

Visualization comparison engine 208 may be employed by the user to generate suggested visualization templates for viewing target data set 212. A visualization template may provide a data visualization which a user may then customize to their specific target data set 212. The visualization template may include suggested graphs, charts, timelines, and other visual data representations. Visualization comparison engine 208 may generate suggested visualization templates based on the target data set ontology, the target data set 212, and prior visualization templates stored in visualization template data set 214. The prior visualization templates stored in template data set 214 may include visualizations built by users (either different users or the current user) based on other data sets. The visualization templates may be stored with information about the ontologies and data that the visualization template was created to display.

Visualization comparison engine 208 may compare the target data set ontology and the target data set 212 to stored information about the data and ontologies of prior visualization templates stored in the template data set 214. Visualization comparison engine 208 may use the comparison to determine prior visualization templates that may be useful for the current user, either as a starting point or as a complete data presentation package. Visualization templates may be selected by visualization comparison engine 208 based on similarities between the template ontology and data and the target data set ontology and target data.

For example, a previous user may have built an extensive visualization for displaying a past data set. If the past data set was similar to the user's current target data set, in either or both of the data stored or the ontology of the data stored, the previous user's visualization may be helpful for displaying the current user's similar data. According to similarities between the ontology and data of the past data and the ontology and data of the target data set 212, visualization comparison engine 208 may select one or more visualization templates from the template data set 214 for suggestion to the user. Similarities between the visualization template data sets and ontologies and target data set 212 and ontology may be determined, for example, based on a weighted scoring of object types in common, similar object counts, ontology hierarchy in common, and any other weighted facet or feature of the ontologies and data. Visualization comparison engine 208 may provide the visualization template suggestions as a ranked list, for example based on a scoring of similarities between the target set 212 and ontology and the data sets and ontology of the suggested visualizations.

In some implementations, visualization comparison engine 208 may adjust the weights of the similarity comparison based on user behavior according to a machine learning process. For example, if a user selects and ultimately uses a specific visualization template, visualization comparison engine 208 may upwardly adjust the weights of those categories where the template data and ontology matched the target data and ontology and downwardly adjust those categories where there was no match.

After selection of a visualization template through the use of visualization comparison engine 208, the user may access visualization system 209. Visualization system 209 may receive the selected visualization template and target data set 212. Visualization system 209 may provide a user with tools to modify, add to, reduce, and/or otherwise alter the selected visualization template to produce visualizations based on target data set 212. Visualization system 209 may provide such tools through a graphic and/or point and click style interface.

Accordingly, the system depicted via schematic 200 may provide a user with all of the tools necessary to transform a tabular framework data set into an object based data set, compare the tabular framework data set to other data sets, and to generate data visualizations of the original data set and any comparison data set. The user may be afforded the ability to perform all of these tasks without the requirement of writing any computer code or scripts, entirely through intuitive point and click interfaces. These tools may be useful in providing access to data analysis systems previously inaccessible to non-technical users. Furthermore, they may accelerate and simplify the generation of analyses even by technical users.

Example System Architecture

Figure 3:
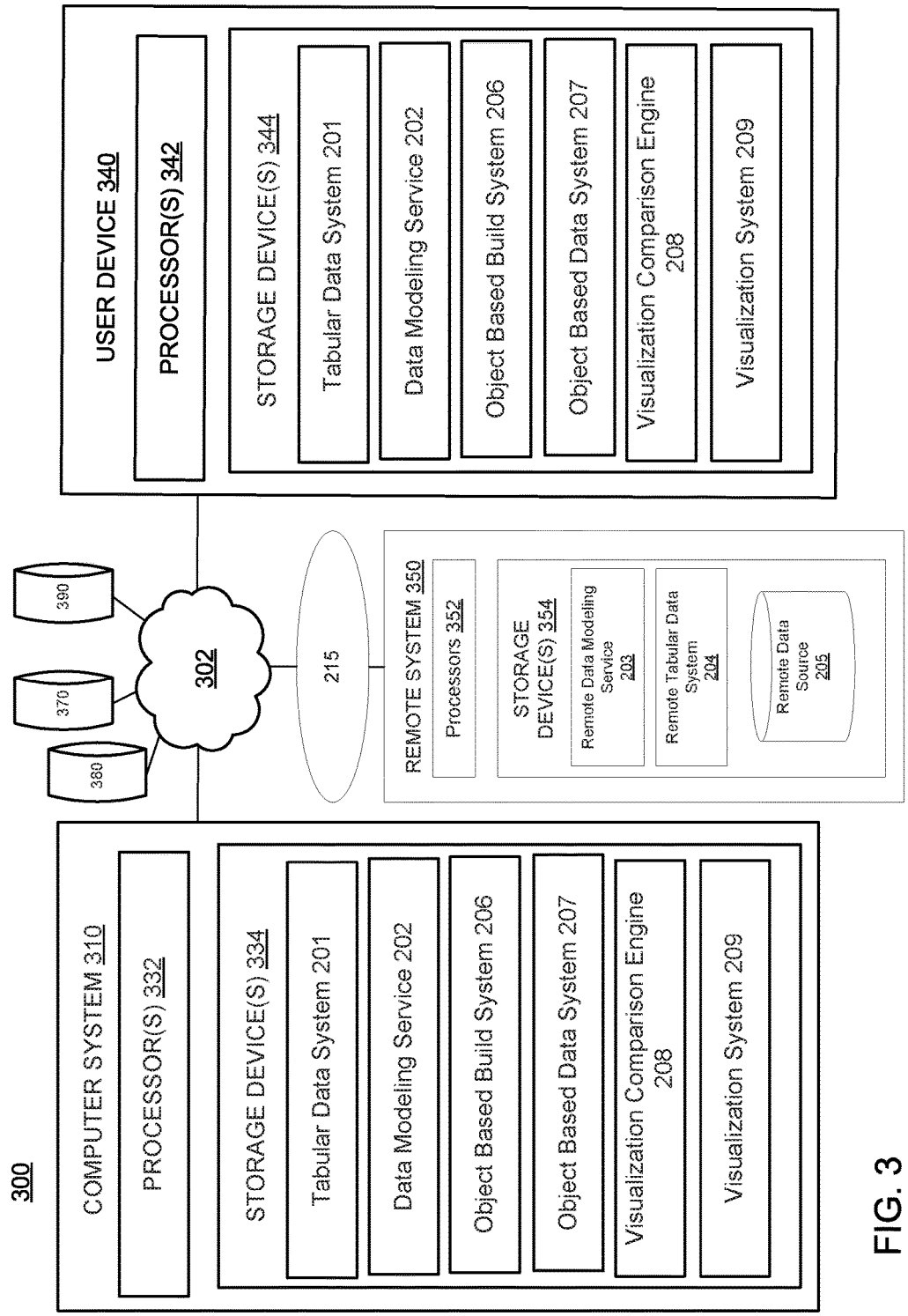
FIG. 3 depicts a system for data analysis assistance.

FIG. 3 depicts a system 300 for facilitating the transform and visualization of tabular based data. In one implementation, system 300 may include a computer system 310, a user device 340, a remote system 350, data exchange 215, a tabular data module 370, an object based data module 380, and a template storage module 390 in communication via network 302, and/or other components. Data modules 370, 380, 390 are illustrated in FIG. 1 as separate from computer system 310 and user device 340. In some implementations, data modules 370, 380, 390 may be stored on the computer system 310, user device 340, or at a remote location.

Data exchange 215 may be a software module operating on computer system 310, user device 340, remote system 350, or another computer system. Data exchange 215 may provide computer instructions that, when executed, create an exchange or marketplace where user's may exchange, access, and share data sets. In some implementations, data exchange 215 may host versions of the shared data sets. In some implementations, data exchange 215 may facilitate access to the hosts of the shared data sets.

Tabular data module 370 may be a computer memory configured to store data. Tabular data module 370 may store a data set formatted with a tabular structure. A tabular data structure may be defined by a data schema, encompassing data schema related information including at least the names of the columns of the table, the data types of the columns, user descriptions of the columns, etc. Tabular data module 370 may be configured to store an origin data set 210.

Object based data module 380 may be a computer memory configured to store data. Object based data module 380 may store a data set formatted with an object based structure according to an ontology, as described, e.g., with respect to FIG. 1. Object based data module 380 may be configured to store a target data set 212.

Template storage data module 390 may be a computer memory configured to store data. Template storage data module 390 may store information associated with data visualizations of object based data. Template storage data module 390 may be configured to store a visualization template data set 214.

Computer system 310 may be configured as a server (e.g., having one or more server blades, processors, etc.), a personal computer (e.g., a desktop computer, a laptop computer, etc.), a smartphone, a tablet computing device, and/or other device that can be programmed to receive tabular data or object based data, provide services for the manipulation of the data, and provide services for transformation and display of the data.

Figure 5:
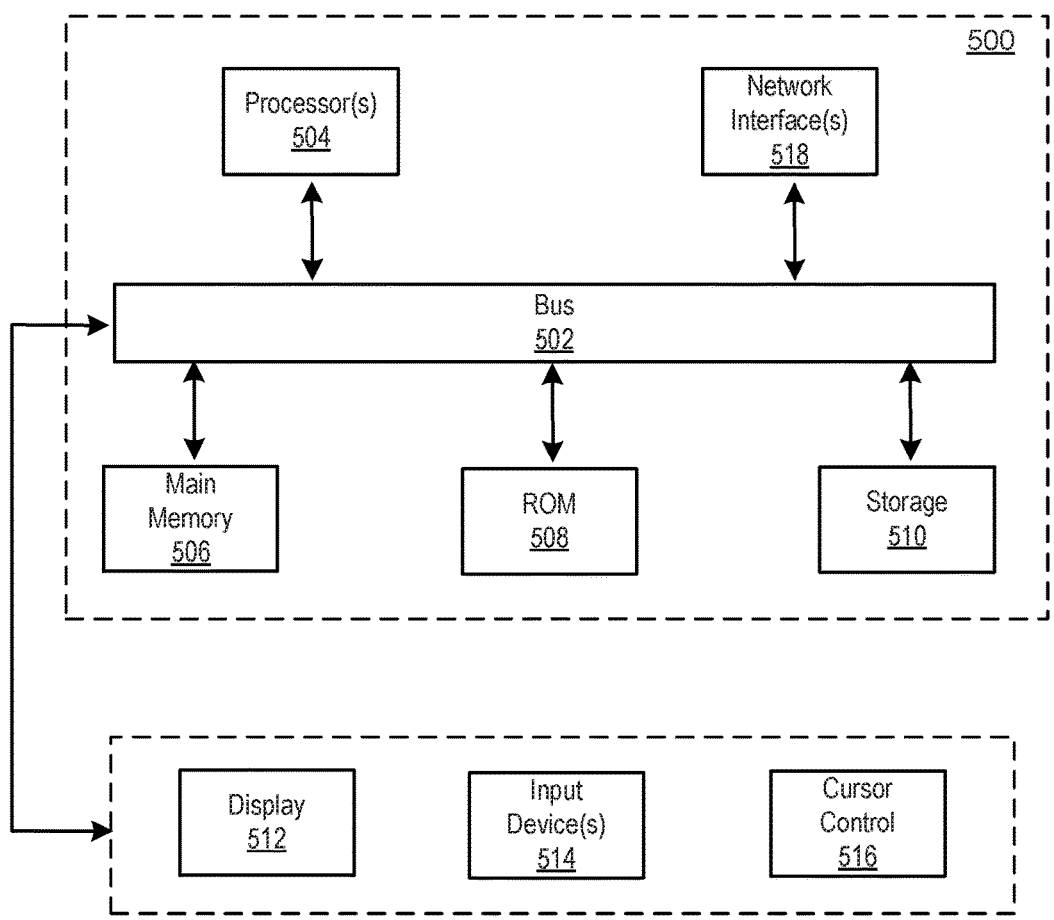
FIG. 5 depicts a block diagram of an example computer system in which any of the embodiments described herein may be implemented.

Computer system 310 may include one or more processors 332 (also interchangeably referred to herein as processors 332, processor(s) 332, or processor 332 for convenience), one or more storage devices 334, and/or other components. Processors 332 may be programmed by one or more computer program instructions stored on storage device 334. For example, processors 332 may be programmed by tabular data system 201, data modeling service 202, object based build system 206, object based data system 207, visualization comparison engine 208, and visualization system 209, and/or other instructions that program computer system 310 to perform various operations, each of which are described in greater detail herein. As used herein, for convenience, the various instruction modules, systems, and engines will be described as performing an operation, when, in fact, the various instructions program the processors 332 (and therefore computer system 310) to perform the operation. Further details and features of a computer system 310 configured for implementing features of the described technology may be understood with respect to computer system 500 as illustrated in FIG. 5.

User device 340 may be configured as a server (e.g., having one or more server blades, processors, etc.), a personal computer (e.g., a desktop computer, a laptop computer, etc.), a smartphone, a tablet computing device, and/or other device that can be programmed to receive tabular data or object based data, provide services for the manipulation of the data, and provide services for transformation and display of the data.

User device 340 may include one or more processors 342 (also interchangeably referred to herein as processors 342, processor(s) 342, or processor 342 for convenience), one or more storage devices 344, and/or other components. Processors 342 may be programmed by one or more computer program instructions. For example, processors 342 may be programmed by data tabular data system 201, data modeling service 202, object based build system 206, object based data system 207, visualization comparison engine 208, and visualization system 209, and/or other instructions that program user device 340 to perform various operations, each of which are described in greater detail herein. As used herein, for convenience, the various instruction modules will be described as performing an operation, when, in fact, the various instructions program the processors 342 (and therefore user device 340) to perform the operation.

Remote system 350 may be configured as a server (e.g., having one or more server blades, processors, etc.), a personal computer (e.g., a desktop computer, a laptop computer, etc.), a smartphone, a tablet computing device, and/or other device that can be programmed to receive tabular data or object based data, provide services for the manipulation of the data, and provide services for transformation and display of the data.

Remote system 350 may include one or more processors 352 (also interchangeably referred to herein as processors 352, processor(s) 352, or processor 352 for convenience), one or more storage devices 354, and/or other components. Processors 352 may be programmed by one or more computer program instructions. For example, processors 352 may be programmed by remote data modeling service 203, remote tabular data system 204, and/or other instructions that program remote system 350 to perform various operations, each of which are described in greater detail herein. Remote data system 350 may access remote data source 205. As used herein, for convenience, the various instruction modules will be described as performing an operation, when, in fact, the various instructions program the processors 352 (and therefore remote system 350) to perform the operation.

Various aspects of the transform facilitation system may operate on computer system 310 and/or on user device 340. That is, the various modules described herein may each operate on one or both of computer system 310 and/or user device 340.

Tabular data system 201 may be a software module operating on computer system 310 and/or user device 340. Tabular data system 201 may include programming instructions that cause the host computer system to run a data system configured for manipulating, modifying, altering, and otherwise handling tabular data sets. Tabular data system 201 may include a graphical and/or text based user interface as well as the necessary software tools, functions, and methods to permit a user to interact with tabular data. In some implementations, tabular data system may access an origin data set 210 stored in tabular data storage module 370.

Data modeling service 202 may be a software module operating on computer system 310 and/or user device 340. Data modeling service 202 may include programming instructions that cause the host computer system to provide a visual interface for permitting a user to interact with tabular data system 201. Data modeling service 202 may access a target data ontology to provide a user with a visual point and click interface permitting the mapping of table/column/row data as provided by tabular data system 201 to an object based target data set 212. Data modeling service 202 may permit a user to designate or map data of an origin data set 210 to object types, object components, and object links according to a target data set ontology. Data modeling service 202 may provide various visual tools, such as drop down menus, radio buttons, nested menus, and others, to allow a user to point to data of origin data set 210 (e.g., using a mouse or other computer interface tool) and select a corresponding ontology detail for that data. For example, a user may view a table and designate the table as corresponding to a specific object type. The user may then be given the opportunity to designate columns of the table as representatives of specific properties supported by the selected object type. Based on the user's designations, each entry of the table may be transformed into an object of the selected type having the selected properties by the object based build system 207.

Data modeling service 202 may also be configured to communicate with other data modeling services, e.g., remote data modeling service 203. Data modeling service 202 may identify remote data modeling service 203 via data exchange 215. Data modeling service 202 may communicate with remote data modeling service 203 to gain access to a remote data source 205.

Data modeling service 202 may provide a user with the ability to import data from remote data source 205. Data modeling service 202 may analyze remote data source 205 and identify portions of remote data source 205 as suggestions for a data import. Data modeling service 202 may base such identification on a comparison between the data and the ontology of target data set 212 and the data and ontology of remote data source 205, as imposed by remote data modeling service 203. Data modeling service 202 may further permit a user to select portions of remote data source 205 for import, either according to a tabular data format (e.g., the user can select tables, columns, and rows) of remote data source 205 or according to an imposed ontology (e.g., the user may select objects, object types, etc., for import).

Object based build system 206 may be a software module operating on computer system 310 and/or user device 340. Object based build system 206 may include programming instructions that cause the host computer system to receive any or all of the data mapping specified by the user via data modeling service 202, the selected target set ontology, the origin data set 210, and the selected data from remote data source 205 to perform a data transform to produce target data set 212.

Object based build system 206 may generate software instructions of a transform script according to the data mapping specified by the user via data modeling service 202. The generated software instructions may be generated according to the received data mapping as well as the target data ontology. The generated software instructions may be generated for deployment across the origin data set 210 and selected data from the remote data source 205 to produce an object based data set, e.g., target data set 212, according to the user's mapped associations between the target ontology and the origin data set 210 and remote data source 205.

Object based build system 206 may further be configured to deploy the generated transform script across all or a portion of the origin data set 210 and remote data source 205 to produce target data set 212. The generated transform script may be compiled by object based build system 206 and deployed across all or a portion of origin data set 210 and remote data source 205. The generated transform script may transform the tabular data operated on to an object based format stored as target data set 212. In some implementations, object based build system 206 may update or modify a portion of an existing target data set 212, rather than generating an entirely new data set.

Object based data system 207 may be a software module operating on computer system 310 and/or user device 340. Object based data system 207 may include programming instructions that cause the host computer system to provide a user with an interface and with tools to manipulate and modify an object based data set, e.g., target data set 212.

Visualization comparison engine 208 may be a software module operating on computer system 310 and/or user device 340. Visualization comparison engine 208 may include programming instructions that cause the host computer system to compare aspects of target data set 212 with information associated with visualization templates stored in a visualization template data set 214 stored in visualization template data module 390. The information associated with visualization templates may include information about the ontologies and data sets for which the visualization templates were built. The ontology and data of the target data set 212 may be compared by visualization comparison engine 208 to the ontologies and data associated with the stored visualization templates. Each aspect of comparison may be weighted to determine a similarity score between the target data set 212 and the data sets associated with the visualization templates. Visualization templates that have high similarity scores may be suggested to the user for use with the user's target data set 212. User selection of a visualization template may cause visualization comparison engine 208 to use machine learning algorithms to update the comparison weighting for future comparisons.

Visualization system 209 may be a software module operating on computer system 310. Visualization system 209 may include programming instructions that cause the host computer system to receive a selected visualization template from visualization comparison engine 208 and produce a data visualization based on the selected visualization and the target data set 212. Visualization system 209 may thus produce a visualization of target data set 212, including charts, graphs, and other visual data representations, according to rules specified by the selected visualization template. Visualization system 209 may further permit the user to manipulate, revise, alter, add to, and otherwise interact with the data visualization provided by visualization system 209.

Remote data modeling service 203 may be a software module operating on remote system 350. Remote data modeling service 203 may include programming instructions that cause remote system 350 to carry out any or all of the functions described above with respect to data modeling service 202. Remote data modeling service 203 may communicate with data modeling service 203 to provide access to remote data source 205.

Remote tabular data system 204 may be a software module operating on remote system 350. Remote tabular data system 204 may include programming instructions that cause remote system 350 to carry out any and all tasks as described with respect to tabular data system 201.

Although illustrated in FIG. 3 as a single component, computer system 310 and user device 340 may each include a plurality of individual components (e.g., computer devices) each programmed with at least some of the functions described herein. In this manner, some components of computer system 310 and/or user device 340 may perform some functions while other components may perform other functions, as would be appreciated. The one or more processors 332, 342 may each include one or more physical processors that are programmed by computer program instructions. The various instructions described herein are exemplary only. Other configurations and numbers of instructions may be used, so long as the processor(s) 332, 342 are programmed to perform the functions described herein.

Furthermore, it should be appreciated that although the various instructions are illustrated in FIG. 3 as being co-located within a single processing unit, in implementations in which processor(s) 332, 342 includes multiple processing units, one or more instructions may be executed remotely from the other instructions.

Additionally, the modular software breakdown as illustrated in FIG. 3 is prepared for illustrative purposes only. The various instructions described with respect to specific software modules may be implemented by alternative software modules configured in different arrangements and with alternative function sets.

The description of the functionality provided by the different instructions described herein is for illustrative purposes, and is not intended to be limiting, as any of instructions may provide more or less functionality than is described. For example, one or more of the instructions may be eliminated, and some or all of its functionality may be provided by other ones of the instructions. As another example, processor(s) 332, 342 may be programmed by one or more additional instructions that may perform some or all of the functionality attributed herein to one of the instructions.

The various instructions described herein may be stored in a storage device 334, 344 which may comprise random access memory (RAM), read only memory (ROM), and/or other memory. The storage device may store the computer program instructions (e.g., the aforementioned instructions) to be executed by processor 332, 342 as well as data that may be manipulated by processor 332, 342. The storage device may comprise floppy disks, hard disks, optical disks, tapes, or other storage media for storing computer-executable instructions and/or data.

The various components illustrated in FIG. 3 may be coupled to at least one other component via a network 302, which may include any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network. In FIG. 3, as well as in other drawing Figures, different numbers of entities than those depicted may be used. Furthermore, according to various implementations, the components described herein may be implemented in hardware and/or software that configure hardware.

Figure 4:
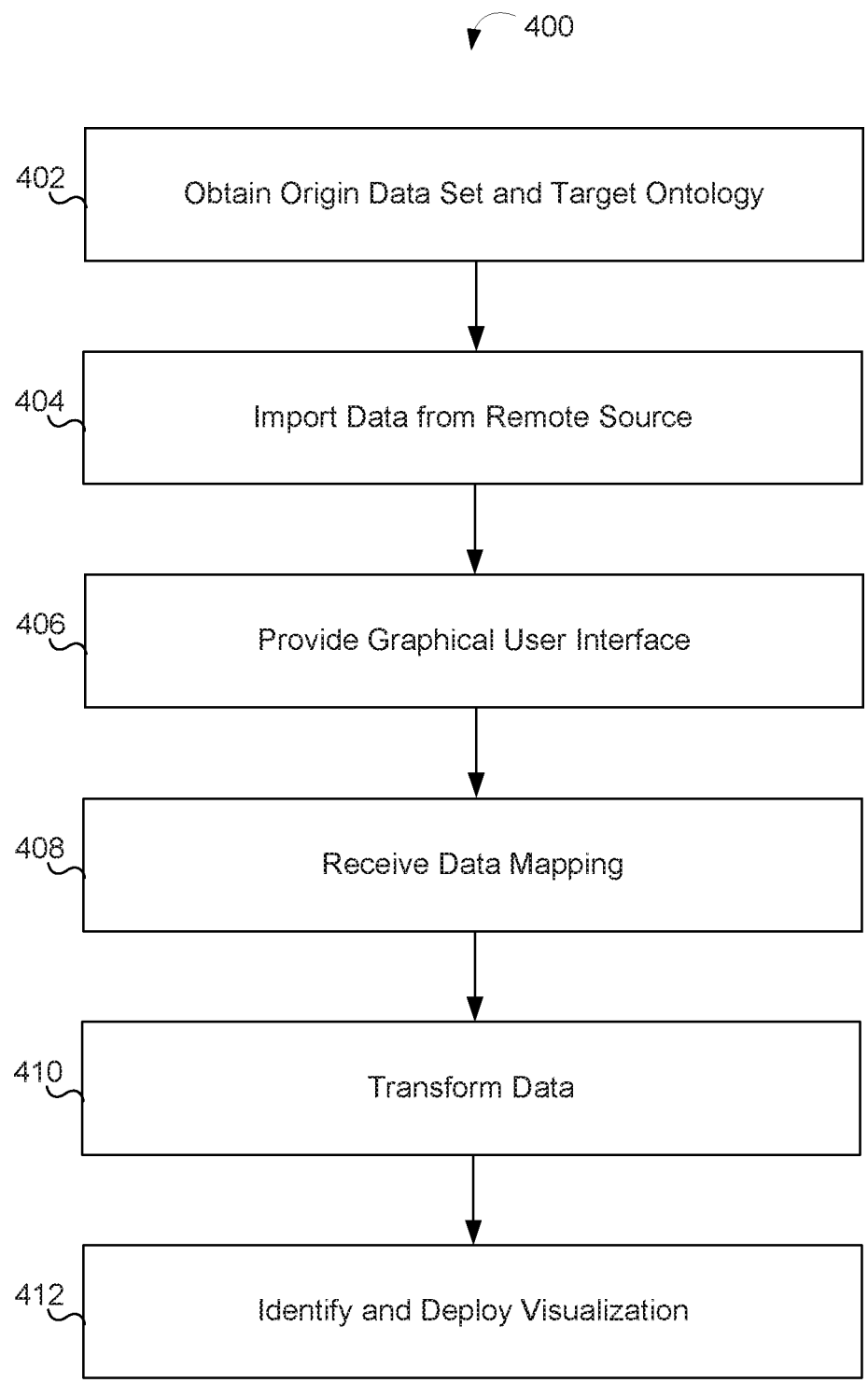
FIG. 4 depicts a process flow chart of a method for performing data analysis, according to some implementations.

FIG. 4 depicts a process flow chart of a method for facilitating the user implementation of data transformations. The various processing operations and/or data flows depicted in FIG. 4 (and in the other drawing figures) are described in greater detail herein. The described operations may be accomplished using some or all of the system components described in detail above and, in some implementations, various operations may be performed in different sequences and various operations may be omitted. Additional operations may be performed along with some or all of the operations shown in the depicted flow diagrams. One or more operations may be performed simultaneously. Accordingly, the operations as illustrated (and described in greater detail below) are exemplary by nature and, as such, should not be viewed as limiting.

In an operation 402, data transformation process 400 may include obtaining an origin data set 210 and a target data set ontology. Tabular data system 201 may import or otherwise obtain origin data set 210. The user may engage or activate data modeling service 202 to operate in conjunction with tabular data system 201. As a step in activating data modeling service 202, the user may select, import, or otherwise add a target data set ontology to the data modeling service 202 environment. The target data set ontology may be selected by a user from a catalog or menu of optional ontologies, may be imported from a remote location, and/or may be obtained via any other suitable methods.

In an operation 404, data transformation process 400 may include importing data from remote data source 205. Data modeling service 202 may access a data exchange 215 to allow the user to identify a remote data source 205 that they may wish to compare to the origin data set 210. Data exchange 215 may host remote data sources and/or may provide links to such external data sources. After selecting a remote data source 205, data modeling service 202 may import the selected remote data source 205. In some implementation, data modeling service 202 may interface with a remote data modeling service 203 associated with the remote data source 205.

Data modeling service 202 may be configured to assist the user in selecting portions of remote data source 205 for import. Data modeling service 202 may compare the origin data set 210 and the selected target data set ontology to the data and ontology of the remote data source 205. Data modeling service 202 may identify similarities based on the comparison, and provide a suggestion to the user that data portions (e.g., having a similar number or type of objects, having similar data, having objects with similar properties, etc.) of remote data source 205 similar to the origin data set 210 be selected for import.

Importing remote data source 205 may include transferring all of remote data source 205 to a user's host computer system and/or transferring a selected portion of remote data source 205 to the user's host computer system. For example, after a user selects portions of remote data source 205 for analysis, importation may include importing the selected portions.

In an operation 406, data transformation process 400 may include providing a graphical user interface displaying origin data set 210. In some implementations, the provided graphical user interface may also display imported data from remote data source 205. The graphical user interface may facilitate the user's interaction with the origin data set 210 and the selected remote data. The graphical user interface provided by data modeling service 202 may provide the user with tools and options to manipulate and view the tabular data in tabular data system 201.

In an operation 408, data transformation process 400 may include receiving a data mapping designating data objects of the origin data set 210 according to the target ontology. Data modeling service 202 may receive the user mapping of tables, columns, and rows of the origin data set 210 and selected portions of the remote data source 205 to objects, properties, and other aspects of the target ontology. The user may designate or map a portion of either the origin data set 210 or remote data source 205 to an target data set ontology aspect—e.g., a table may be designated as an object type. Based on a first mapping, data modeling service 202 may provide the user with options for a second, subsidiary mapping. For example, is a user designates a table as corresponding to a specific object type (i.e., a first mapping), the system may then permit the user to designate columns of the table to properties allowed on the specified object type (i.e., a subsidiary or secondary mapping). Thus, data modeling service 202 may permit the user to map the tabular data of the origin data set 210 and remote data source 205 to the target data set ontology according to the hierarchy of the ontology.

In an operation 410, data transformation process 400 may include transforming at least a portion of the origin data set 210 according to the user data mapping to generate the target data set 212. Data modeling service 202 may transfer the user data mapping to object based build system 206 to generate a transform script. The user data mapping selections between portions of the tabular based data and the target data set ontology may be used to generate the necessary software code to perform the data mapping across the origin data set 210 and remote data source 205. In some implementations, data modeling service 202 may transfer data mapping selections as they are entered by the user, and object based build system 206 may generate transform script code concurrently. In some implementations, data modeling service 202 may transfer data mapping selections after a user has completed their selections, and object based build system 206 may generate the transform script all at once when all of the user's mapping designations are received.

Object based build system 206 may, after receiving all user mapping designations, compile the transform script and deploy it across selected portions of origin data set 210 and remote data source 205 to generate the target data set 212. The transform script, created according to the user mapping designations, may codify all of the user's mapping designation selections.

In an operation 412, data transformation process 400 may include identifying a visualization template and deploying a selected visualization template across the target data set 212. Visualization comparison engine 208 may identify one or more visualization templates from those stored in visualization template data set 214 as being appropriate for the user's target data set 212. Visualization system 209 may deploy the selected visualization template across the target data set 212 to provide the user with a visual analysis of the target data set.

Visualization comparison engine 208 may identify one or more visualization templates based on a comparison between the data and ontology of target data set 212 and the data and ontologies of the stored visualization templates. Different aspects of the comparison may be weighted in determining similarities between the target data set 212 and the data sets underlying the visualization templates. For example, if the ontologies use two objects that are of an identical type, this similarity may be given a higher weight than if the ontologies use two objects that are similar but not identical (i.e., the objects share some but not all property types). Visualization comparison engine 208 may use the comparison to determine which visualization templates were generated based on data similar to the of the user. For example, visualization templates based on data sets have a similar ontology (e.g., using many of the same or similar objects). Other aspects that may be compared may include object counts, object type counts, linkage types, linkage counts, and any other aspect of the data ontology or data set that may be compared. Visualization comparison engine 208 may thus present to the user a selection of identified visualization templates built by previous users for displaying data that has characteristics similar to those of the user's target data set 212.

Thus, data transformation process 400 may provide a method for a user to access and manipulate a tabular based data set, import additional tabular data, map the original set and the imported data to a selected object based ontology, transform the data according to the mapping, and visualize the transformed data. The method may allow a user to perform all of this without having to write any script or code. Thus, the method may be advantageous for non-technical users as well as technical users that would like to import, transform, and visualize data quickly and efficiently.

FIG. 5 depicts a block diagram of an example computer system 500 in which any of the embodiments described herein may be implemented. The computer system 500 includes a bus 502 or other communication mechanism for communicating information, one or more hardware processors 504 coupled with bus 502 for processing information. Hardware processor(s) 504 may be, for example, one or more general purpose microprocessors.

The computer system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

The computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions.

The computer system 500 may be coupled via bus 502 to a display 512, such as a cathode ray tube (CRT) or LCD display (or touch screen), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 500 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may retrieves and executes the instructions. The instructions received by main memory 506 may optionally be stored on storage device 510 either before or after execution by processor 504.

The computer system 500 also includes a communication interface 518 coupled to bus 502. Communication interface 518 provides a two-way data communication coupling to one or more network links that are connected to one or more local networks. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN (or WAN component to communicated with a WAN). Wireless links may also be implemented. In any such implementation, communication interface 518 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 518, which carry the digital data to and from computer system 500, are example forms of transmission media.

The computer system 500 can send messages and receive data, including program code, through the network(s), network link and communication interface 518. In the Internet example, a server might transmit a requested code for an application program through the Internet, the ISP, the local network and the communication interface 518.

The received code may be executed by processor 504 as it is received, and/or stored in storage device 510, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational NoSQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

Other implementations, uses and advantages of the invention will be apparent to those skilled in the art from consideration of the specification and practice of the invention disclosed herein. The specification should be considered exemplary only, and the scope of the invention is accordingly intended to be limited only by the following claims.

The invention claimed is:

1. A system for assisting a user in performing transform of an origin data set into a target data set, the system comprising:
one or more processors; and
memory storing instructions that, when executed by the one or more processors, cause the system to:
obtain the origin data set, the origin data set being organized in a tabular framework defined by an origin data schema;
provide a graphical user interface displaying the origin data set;
receive through the graphical user interface, at least one designation of a data object, the at least one designation of the data object mapping at least a portion of the origin data set to the data object;
generate a data transform file based on the at least one designated data object, the data transform file generated in response to receiving the at least one designation of the data object;
transform the origin data set into the target data set based on an execution of the data transform file, the target data set having an object-oriented based framework;
compare the object-oriented based framework of the target data set to respective object-oriented based frameworks of a plurality of reference data sets;
detect, based on the comparison, similarities between the object-oriented based framework of the target data set and the respective object-oriented based frameworks of the plurality of reference data sets;
determine, based on the similarities, a respective similarity score for at least one of the plurality of reference data sets;
select a comparable reference data set based on the at least one respective similarity score;
obtain a data visualization template associated with the comparable reference data set;
apply the visualization template to the target data set; and
display, through the graphical user interface, the target data set based on the visualization template.

2. The system of claim 1, wherein the system is further caused to:
receive, through the graphical user interface, a selection of a target data set ontology defining the object based framework of the target data set; and
wherein to receive the at least one designation of the data object the system is further caused to receive the at least one designation according to the target data set ontology.

3. The system of claim 2, to receive the at least one designation of the data object the system is further caused to:
provide, through the graphical user interface, a plurality of object types according to the target data set ontology; and
receive, through the graphical user interface, a selection of one of the plurality of object types.

4. The system of claim 3, wherein the system is further caused to
receive a designation of an object property within the origin data set according to the target data set ontology and the at least one designation of the data object.

5. The system of claim 1, wherein to generate the data transform, the system is further caused generate software code of a transform script.

6. The system of claim 1, wherein the system is further caused to:
provide a user access to a plurality of remote data sets; and
import a user selected remote data set.

7. The system of claim 6, wherein the system is further caused to
compare the target data ontology to a remote data set ontology of the user selected remote data set; and
identify portions of the user selected remote data set according to the comparison.

8. The system of claim 6, wherein the system is further caused to:
receive, through the graphical user interface, at least one designation of a remote data object within the remote data set; and
transform at least a portion of the user selected remote data set into the target data set,
wherein to generate the data transform the system is further caused to generate the data transform according to the at least one designation of the remote data object within the remote data set.

9. The system of claim 1, wherein the to compare the target data set to the plurality of reference data sets, the system is further caused to:
compare a target data set ontology of the target data set to a plurality of ontologies of the plurality of reference data sets; and
compare data of the target data set to information about data of the plurality of reference data sets.

10. A computer implemented method of assisting a user in the transform of an origin data set into a target data set, the method being performed on a computer system having one or more physical processors programmed with computer program instructions that, when executed by the one or more physical processors, cause the computer system to perform the method, the method comprising:
obtaining, by the computer system, the origin data set, the origin data set being organized in a tabular framework defined by an origin data schema;
providing, by the computer system, a graphical user interface displaying the origin data set;
receiving, by the computer system, through the graphical user interface, at least one designation of a data object, the at least one designation of the data object mapping at least a portion of the origin data set to the data object;
generating, by the computer system, a data transform file based on the at least one designated data object, the data transform file generated in response to receiving the at least one designation of the data object;
transforming, by the computer system, the origin data set into the target data set based on an execution of the data transform file, the target data set having an object-oriented based framework;
comparing, by the computer system, the object-oriented based framework of the target data set to respective object-oriented based frameworks of a plurality of reference data sets;
detecting, by the computer system based on the comparison, similarities between the object-oriented based framework of the target data set and the respective object-oriented based frameworks of the plurality of reference data sets;
determining, by the computer system based on the similarities, a respective similarity score for at least one of the plurality of reference data sets;

selecting, by the computer system, a comparable reference data set based on the at least one respective similarity score;

obtaining, by the computer system, a data visualization template associated with the comparable reference data set;

applying, by the computer system, the visualization template to the target data set; and displaying, by the computer system, through the graphical user interface, the target data set based on the visualization template.

11. The method of claim 10, further comprising:

receiving, by the computer system, through the graphical user interface, a selection of a target data set ontology defining the object based framework of the target data set; and wherein receiving the at least one designation of the data object includes receiving the at least one designation according to the target data set ontology.

12. The method of claim 11, wherein receiving the at least one designation of the data object includes:

Providing, through the graphical user interface, with a plurality of object types according to the target data set ontology; and receiving, through the graphical user interface, a selection of one of the plurality of object types.

13. The method of claim 12, further comprising receiving, by the computer system, a designation of an object property within the origin data set according to the target data set ontology and the at least one designation of the data object.

14. The method of claim 10, wherein generating the data transform includes generating software code of a transform script.

15. The method of claim 10, further comprising:

providing, by the computer system, a user access to a plurality of remote data sets; and importing, by the computer system, at least a portion of a user selected remote data set.

16. The method of claim 15, further comprising:

comparing, by the computer system, the target data ontology to a remote data set ontology of the user selected remote data set; and identifying portions of the user selected remote data set according to the comparison.

17. The method of claim 15, further comprising receiving, by the computer system, through the graphical user interface, at least one designation of a remote data object within the remote data set; and transforming, by the computer system, at least a portion of the user selected remote data set into the target data set, wherein generating the data transform the system includes generating the data transform according to the at least one designation of the remote data object within the remote data set.

18. The method of claim 10, wherein comparing the target data set to the plurality of reference data sets includes:

comparing, by the computer system, a target data set ontology of the target data set to a plurality of ontologies of the plurality of reference data sets; and comparing, by the computer system, data of the target data set to information about data of the plurality of reference data sets.

19. A non-transitory computer readable medium comprising instructions that, when executed, cause one or more processors to perform:

obtaining the origin data set, the origin data set being organized in a tabular framework defined by an origin data schema;

providing a graphical user interface displaying the origin data set;

receiving, through the graphical user interface, at least one designation of a data object, the at least one designation of the data object mapping at least a portion of the origin data set to the data object;

generating a data transform file based on the at least one designated data object, the data transform file generated in response to receiving the at least one designation of the data object;

transforming the origin data set into the target data set based on an execution of the data transform file, the target data set having an object-oriented based framework;

comparing the object-oriented based framework of the target data set to respective object-oriented based frameworks of a plurality of reference data sets;

detecting, based on the comparison, similarities between the object-oriented based framework of the target data set and the respective object-oriented based frameworks of the plurality of reference data sets;

determining, based on the similarities, a respective similarity score for at least one of the plurality of reference data sets;

selecting a comparable reference data set based on the at least one respective similarity score;

obtaining a data visualization template associated with the comparable reference data set;

applying the visualization template to the target data set; and displaying, through the graphical user interface, the target data set based on the visualization template.

* * * * *